Jan. 23, 1968   J. H. GORNDT   3,365,032
VISCOUS AND ELASTOMER DAMPED BEARING SUPPORT
Filed June 28, 1966

INVENTOR
John H. Gorndt
BY
Ralph Hammar
ATTORNEY

United States Patent Office 3,365,032
Patented Jan. 23, 1968

3,365,032
VISCOUS AND ELASTOMER DAMPED
BEARING SUPPORT
John H. Gorndt, Erie, Pa., assignor to Lord Corporation,
Erie, Pa., a corporation of Pennsylvania
Filed June 28, 1966, Ser. No. 561,092
6 Claims. (Cl. 188—86)

This invention is a viscous damper for shaft bearings which reduces the shaft whip or vibration. The damping effect is linear and does not fall off at high frequencies.

Figure 1:
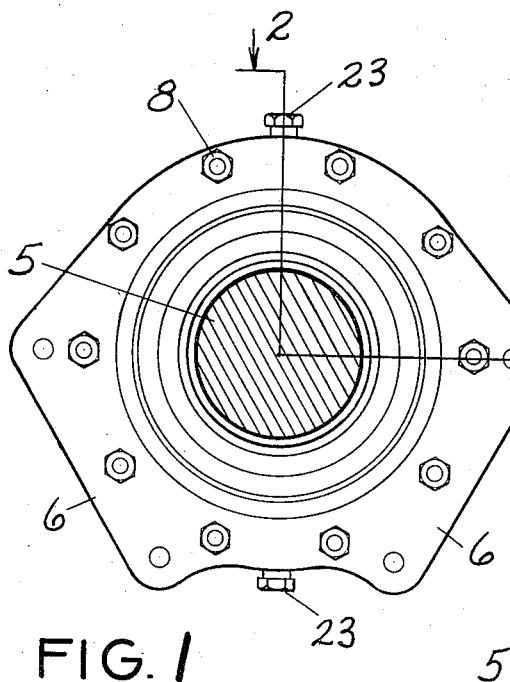
Figure 2:
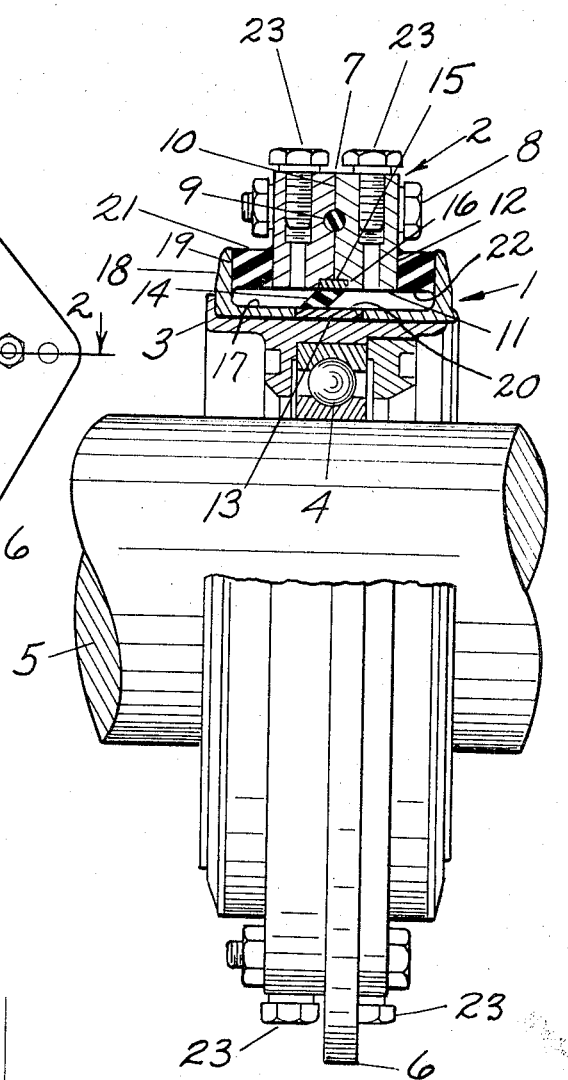
Figure 3:
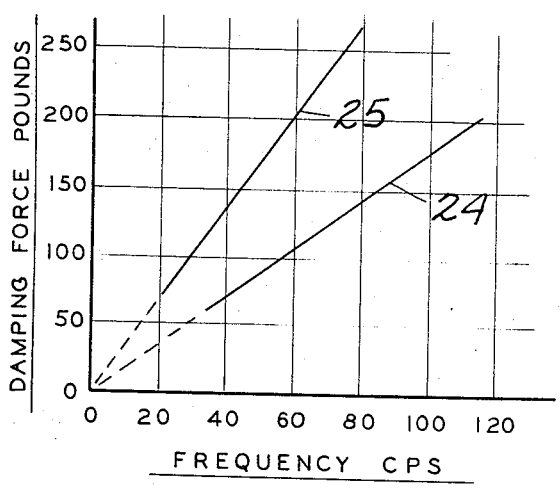

In the drawing, FIG. 1 is an end view of a shaft damper, FIG. 2 is a section on line 2—2 of FIG. 1 and FIG. 3 is a performance diagram.

In a preferred form, the damper comprises inner and outer members 1 and 2. The inner member 1 is fixed to a bearing housing 3 carrying a bearing 4 for a shaft 5. The outer member 2 has suitable mounting brackets 6 for attachment to a supporting structure.

The outer member 2 is split into two identical axially abutting rings 7, each integral with one of the supporting brackets 6. The rings 7 are symmetrical and are turned face to face for assembly and fastened together by bolts 8. A suitable gasket such as O-ring 9 seals the joint 10 between abutting faces of the rings 7. When assembled, the rings 7 form a radially inwardly presented cylindrical surface 11 and axially outwardly presented end surfaces 12.

At the center of the inner member 1 is a cylindrical ring 13 opposite the joint 10 between the rings 7. An annular body 14 of elastomer is bonded to the ring 13 and is also bonded to a ring 15 suitably seated in a seat 16 opposite the joint 10. On opposite sides of the ring 13 are identical cylindrical rings 17, each having at its outermost edge an outwardly projecting flange 18. Each of the flanges 18 has an axially facing surface 19 spaced from and presented toward the axial surface 12 on the adjacent ring 7. The rings 17 together with the ring 13 when assembled provide a cylindrical surface 20 spaced radially inward from and in opposed relation to the cylindrical surface 11 on the outer member 2. Between each pair of axially facing surfaces 12 and 19 is an annular ring 21 of elastomer bonded to the axially facing surfaces. The elastomeric rings 21 sustain relative radial movement of the inner and outer members of the damper by shear. The inner surfaces 22 of the elastomeric rings 21 are, in effect, a continuation of the cylindrical surface 11 on the outer member 2. Manufacture is simplified by making rings 13, 15 and the elastomer 14 as one unit and the rings 7 and 17 and the elastomer 21 as another unit. The damper requires one of the units 13, 14, 15 and two of the units 7, 17, 21.

When assembled, the cylindrical and axial surfaces of the damper parts and the elastomeric rings 21 cooperate to define an annular chamber surrounding the axis of the shaft 5. The elastomeric ring 14 divides this annular chamber into two separate parts effectively sealed from each other. Both parts of the annular chamber are filled with a viscous liquid through suitable filler ports 23.

In use, eccentric movement of the shaft causes a corresponding displacement of the cylindrical surface 20 on the damper member 1 relative to the cylindrical surface 11 on the damper member 2, resulting in a pumping action, causing circumferential movement of the viscous liquid around the axis of the shaft. This introduces a damping force which is essentially linearly related to the shaft speed or frequency as shown by curves 24 and 25 in FIG. 3. The eccentricity of the shaft for curve 25 was substantially twice the eccentricity for curve 24 which accounts for the steeper slope of the curve 25.

What is claimed as new is:

1. A shaft damper comprising inner and outer supporting and supported members each having a radially presented cylindrical surface and axially presented surfaces at opposite ends of its cylindrical surface, the cylindrical and axially presented surfaces of one member being spaced from and in opposed relation to the corresponding surfaces of the other member, annular elements of elastomer sandwiched between and bonded to the axially presented surfaces and sustaining relative radial motion of said surfaces in shear, said annular elements and cylindrical and axially presented surfaces defining a closed annular chamber, and a viscous liquid in said chamber, one of said members being adapted to receive a shaft bearing and the other of said members being adapted to be fixed to a support whereby vibration of the shaft bearing causes pumping of the liquid around the chamber to produce a damping effect.

2. The damper of claim 1 in which the axially presented surface of one member is on an annular part fixed to said member.

3. The damper of claim 1 in which the outer member is split into two axially abutting parts assembled in sealing relation to each other.

4. The damper of claim 1 in which the inner member has two cylindrical shells each forming part of its cylindrical surface and each having an outwardly extending flange forming one of its axially extending surfaces, and a bearing holder fixed to said shells.

5. The damper of claim 4 in which a spacer ring between the two cylindrical shells completes the cylindrical surface of the inner member.

6. The damper of claim 5 having an annular member of elastomer bonded to said spacer ring and sealed to the outer member for dividing the annular chamber into two parts.

References Cited

UNITED STATES PATENTS 2,857,974 10/1958 Heller _____ 308—184 X
3,101,979 8/1963 Mard _____ 308—184 X FERGUS S. MIDDLETON, Primary Examiner.
G. E. A. HALVOSA, Assistant Examiner.